Jan. 28, 1947.  W. W. McMAHAN  2,415,019
APPARATUS FOR FILLING TIRES WITH FLUID
Filed April 19, 1944
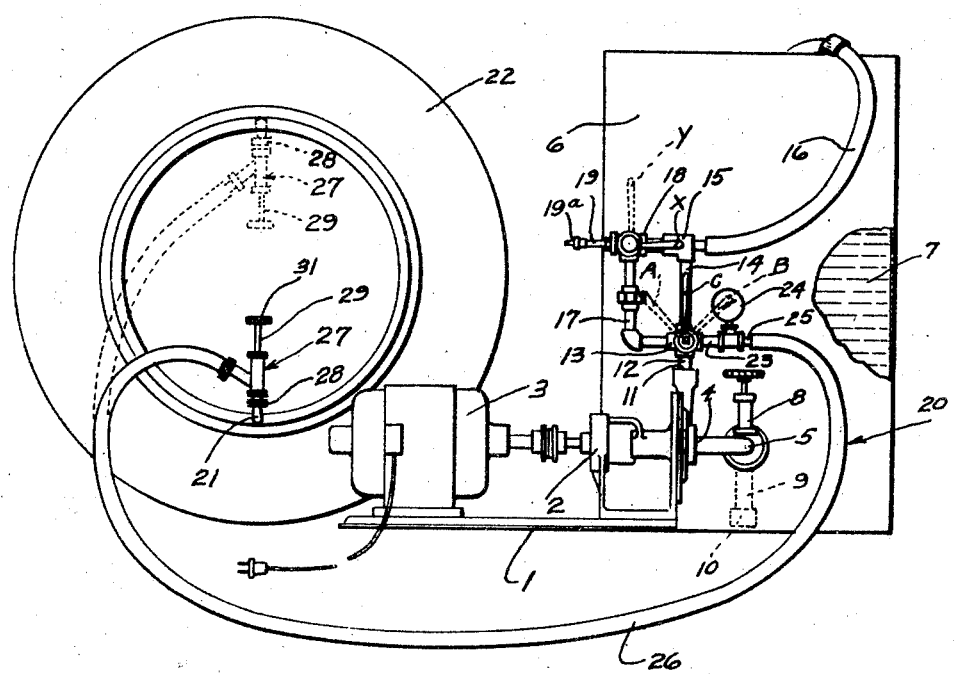
Fig.1
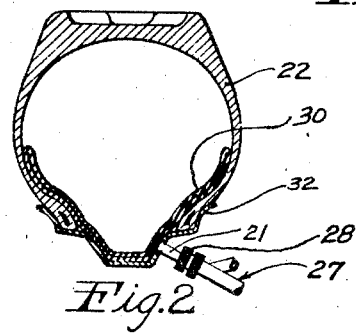
Fig.2
Fig.3
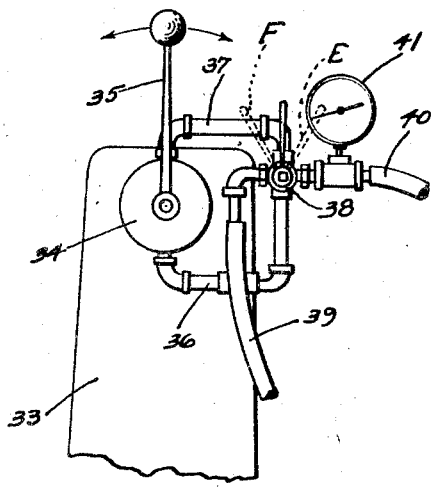
Fig.4
Inventor
William W. McMahan
By
Attorney Patented Jan. 28, 1947

2,415,019

UNITED STATES PATENT OFFICE 2,415,019

APPARATUS FOR FILLING TIRES WITH FLUID

William W. McMahan, Akron, Ohio, assignor to Wingfoot Corporation, Akron, Ohio, a corporation of Delaware Application April 19, 1944, Serial No. 531,735

1 Claim. (Cl. 152—415)

This invention relates to a method and apparatus for inflating pneumatic tires with liquid, involving in such process the evacuation of air from the inner tube contained therein, preliminary to filling. For all practical purposes this process completely evacuates the air to such a degree that any residual air that may remain in the tire will be readily absorbed in the filling liquid, leaving no free air in the tire when completely filled. Because of the flexibility and collapsibility of the inner tube, the air is readily and substantially completely removed therefrom. As the fluid is evacuated, the inner tube collapses and the atmospheric pressure exerted on its exterior flattens the tube and assists in forcing out the air.

The invention is especially adapted to completely syphon out and replace fluid when required as when an anti-freeze solution is substituted for a freezing solution; also, when a repair to the tire is necessary the tube must be completely evacuated. It is well recognized that an air container, such as an inner tube, cannot be made wholly impervious to loss of pressure of a gaseous medium. On the other hand, such a container when pressure-filled with a liquid will retain initial pressures without appreciable loss. This characteristic is especially important in that a completely liquid-filled tire will not lose pressure and disintegrate.

An object of this invention is to provide a method of substantially completely filling tires with liquid to any desired pressure whereby the tire pressure will remain constant, thereby eliminating frequent additions of liquid, and this is accomplished by apparatus so simple that it can be operated in remote places by a person with a minimum amount of skill. The apparatus is applicable to the filling of farm tractor tires or tires on earth-moving machinery where a heavy draw-bar pull is required. The added weight of the liquid in the tires provides added traction and greater draw-bar pull in farm or other work.

Another object of this invention is to provide economical and efficient apparatus which is readily portable to remote places and may be operated to advantage at a substantial saving in time and labor because it eliminates the necessity of removing a tire from a machine and transporting it to the filling apparatus. Instead, the filling apparatus may readily be transported to a machine such as a tractor or other machine using large size tires, where the tires may be filled while mounted thereon.

The apparatus is preferably operated by an electric motor using the ordinary house lighting current and may be plugged into a convenient socket or otherwise connected to the power supply line, but other sources of power may also be used, such as a gasoline motor, or a hand pump may be substituted.

Another object of this invention is to provide an apparatus which is light in weight, is convenient to transport from place to place, and is produced at a low cost, making it readily available to farmers, contractors or service stations, for servicing tires of large cross-sectional size used on vehicles of the aforementioned character.

The objects and advantages of an apparatus of this character will be more apparent when considered in connection with the following description and the accompanying drawing in which:

Figure 1 is an elevation of one embodiment of the invention;

Figure 2 is a cross-sectional view showing the tire containing a tube which has been evacuated;

Figure 3 is a cross-sectional view showing a tire containing an inner tube completely filled with a fluid;

Figure 4 is a modification showing an apparatus whereby a hand pump is used for motive power.

Referring to the drawing, the apparatus comprises a base 1 upon which is mounted a centrifugal pump 2 associated with a fluid supply and driven by a motor 3.

Extending from the pump intake 4, a fluid conducting line 5 extends and communicates with a tank 6 containing a fluid supply 7. A conventional valve 8 is incorporated in the supply line 5 to open or close the fluid supply to the pump 2. The supply line 5 extends through the wall of the tank and is conventionally attached thereto. The line inside the tank is provided with a downwardly extending pipe 9, on the end of which is attached a strainer 10 which prevents foreign matter from entering the system. At the top of the pump and from the outlet 11 a line 12 extends to a 4-way valve 13. A line 14 extends upward and communicates with a conventional syphon fitting or ejector 15. Under the optional control herein explained, a hose 16 extending from the ejector 15 communicates with the upper end of the tank 6 whereby liquid passing through the pump and ejector may be deposited therein. From one side of the 4-way valve 13 a fluid conducting line 17 extends to communicate with a 3-way valve 18, which in turn is connected to the intake end of the ejector 15. The other side of the 3-way valve is provided with a connection 19 to which may be attached an air line when available. This is of especial utility when evacuating a tire containing air, as hereinafter described.

From the other side of the 4-way valve 13 a fluid conducting line 20 extends and communicates with the valve stem 21 of a tire 22. This line is composed of a short pipe 23 to which is attached a gage 24 to determine the extent of vacuum in a tire and also the pressure of the fluid inside the tire during and after inflation. A short pipe or nipple 25 extends from the opposite side of said gage, from which a hose 26 extends. On the free end of the hose is attached a special adapter 27. This adapter is fully disclosed in U. S. Patent No. 2,320,042, issued May 25, 1944, and will be but briefly described herein. The adapter 27 is provided with a swivel nut 28, and has slidably mounted therein a rod or plunger 29 which has a claw or chuck formed on its lower end whereby the inner part of the inner tube valve may be readily removed or replaced by manipulating the plunger 29, depressing and turning to the left to unscrew the inner part, then retracting the rod 29 to remove same from the valve stem. This operation is reversed to replace the valve core. By removing the valve core there will be a free opening through the valve stem body for the passage of fluid into or out of the tire.

When a tire containing fluid is to be evacuated, the operation will be expedited by removing the cap 19a from the pipe 19 and attaching an air line thereto to permit air under pressure to pass through the pipe and valve 18 with the valve handle in open position as indicated by X, which will direct air under pressure through the ejector 15 setting up a suction in the lines 14 and 20. Due to the air passing through the ejector at a greater velocity than liquid, the tire will be evacuated of fluid in less time than when a liquid is used as the evacuating medium through the ejector. The valve 18 is closed when the handle is in a position as indicated at Y.

The operation of the apparatus in regard to the course of the liquid through the manifold and how the fluid is pumped through the by-pass to effectively operate the ejector to evacuate a tire and then fill same by the proper manipulation of the valves will now be described.

Rotate the tire so that the valve stem thereon is in its lowermost position, attach the adapter 27 to said valve stem and remove the valve core containing the inner mechanism of the valve. Open the valve 8, turn handle on the 4-way valve 13 to position A, as indicated in dotted lines, and turn handle on 3-way valve 18 to horizontal position as indicated by X. When the valves are all set in the positions indicated, the motor is started and fluid is pumped from the tank through line 12, the 4-way valve 13, the line 17, the 3-way valve 18 and the ejector 15 now functioning as an ejector of the fluid from the tire, then through the line 16 and back into the tank 6. The fluid forceably pumped through the ejector 15 in this manner and direction sets up a suction in the line 14 through the other side of the 4-way valve 13 and through the line 20 which extends to the tire, thus drawing fluid which may be air or liquid (as in this example explained) from the tire to evacuate same. This evacuating is continued until a vacuum of approximately 28 inches is registered on the gage 24, or until all the fluid is drawn from the tire and the inner tube is in a collapsed condition.

When the inner tube 30 has been evacuated to the proper degree, the tire is rotated so that the valve stem is at its uppermost position, as shown in dotted lines in Figure 1 of the drawing. The handle on the 4-way valve 13 is turned to a position as indicated in dotted lines at B. This opens the valve to line 20 and closes same to lines 14 and 17. This permits liquid to be pumped through the line 20 to the tire 22. When the pressure within the tire has reached approximately 30–35 pounds, turn the 4-way valve handle to a position indicated at C. This closes the valve to the flow of fluid. At this point the motor is stopped and the pressure checked as indicated by the pressure gage 24. The pressure will register slightly higher than that required, but the correct pressure may be obtained by turning the handle on the 4-way valve slightly in either direction for a few seconds to allow the fluid to run back through the pump and into the tank until the proper pressure within the tire is registered by the gage. When the proper pressure is established and the 4-way valve handle is in the position as indicated at C, the inner mechanism of the tire valve, or valve core, is replaced by depressing the plunger rod 29 and turning the handle 31 to the right or clockwise. The tube within the tire will then be completely filled with fluid, and a cross-section of the assembly will take the form as illustrated in Fig. 3 of the drawing.

In order to prevent the tire carcass from collapsing, causing the tire beads to lose their place on the rim 32, it is necessary to occasionally depress the valve stem 21 through the rim hole to admit air into the space vacated by the tube during its collapsing process due to being evacuated. Otherwise, the tire carcass has a tendency to collapse, permitting the beads to slide off the rim ledges.

It is also necessary when filling a tube with liquid to depress the valve stem to permit air to escape as the tube grows due to inflation. Otherwise, air would be trapped between the tube and the inner wall of the tire carcass which would prevent the proper inflation pressure in the inner tube, for any trapped air would take up space intended for the tube, and, by escaping, would cause under-inflation of the tire.

The foregoing is the preferred embodiment of this invention, but in order to provide an apparatus for emergency use or when there is no motive power available, an apparatus as illustrated in Figure 4 of the drawing is provided, which comprises a support 33 upon which is mounted an oscillating manually operated pump 34 equipped with a handle 35. From opposite sides of the pump, fluid-conducting lines 36 and 37 are extended to opposite sides of a 4-way valve 38. Extending from the 4-way valve, a line 39 extends to a liquid supply tank, and a line 40 extends from said valve to a tire which is connected thereto by the same adapter 27 previously described.

The method of evacuating and filling a tire with this device is the same as described in the preceding embodiment. The difference lies in the character of the apparatus and its operation. The operation of the device is as follows. The handle on the 4-way valve 38 is placed in the position as indicated in dotted lines at E. The handle 35 is moved to the right and left as indicated by the arrows. This pumps fluid from the tire through the line 40, through the 4-way valve, through the line 37 to the pump 34, from where the fluid is discharged through line 36, the 4-way valve, then through line 39 to a liquid supply tank. When all fluid from the tire is evacuated, the handle on the 4-way valve is positioned as indicated in dotted lines at F. The fluid is pumped from a supply tank through the same course but in the opposite direction and carries liquid from a supply tank to the tire until the proper pressure is indicated by the gage 41.

Particular value is represented by the provision of the liquid storage tank 6 as thus related to the circulating system, not only to conserve water in locations remote from water supplies, but particularly to use and re-use a valuable non-freeze liquid medium.

The advantages of the method and apparatus disclosed herein will be apparent to anyone who faces the problem of completely filling tires of large cross-sectional diameters with liquid, and the simplicity, economy and efficiency of a device of this character will be appreciated. Although modifications and the sequence of the various operations may vary somewhat under certain conditions, it will be understood that the invention will be limited only by the scope of the appended claim.

I claim:

Apparatus for evacuating fluid from a pneumatic tire and filling the tire with liquid, comprising a liquid supply, a pump having its inlet connected to said liquid supply and its outlet connected to a multiple passage valve, a liquid bypass connecting said valve to a syphon ejector, a conduit for connecting a tire to be evacuated to said valve, and a fluid line leading from said valve to said ejector, said valve in one position connecting said pump outlet to said liquid bypass and also connecting said conduit to said fluid line whereby flow of liquid from said pump outlet through said bypass and said ejector causes suction in said fluid line and said conduit to effect evacuation of a tire connected to said conduit, and said valve in another position connecting said pump outlet to said conduit for effecting filling of a tire with liquid from said liquid supply.

WILLIAM W. McMAHAN.